(No Model.)
R. L. LUKENS.
HARROW AND PULVERIZER BLADE.
No. 484,969. Patented Oct. 25, 1892.
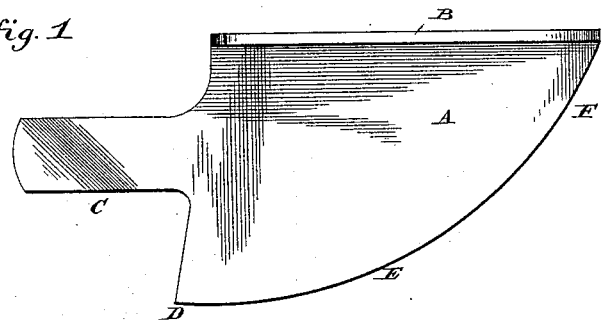
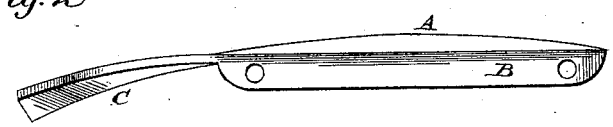
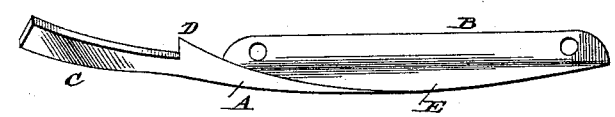
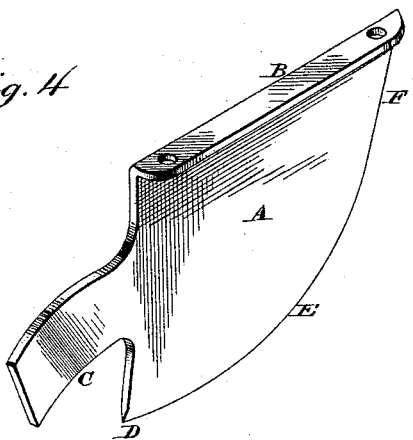
Witnesses.
Inventor
Richard L. Lukens
by W. V. Lifft
his Atty.
THE NORRIS PETERS CO., PHOTO-LITHO., WASHINGTON, D. C.

UNITED STATES PATENT OFFICE.

RICHARD L. LUKENS, OF PEORIA, ILLINOIS.

HARROW AND PULVERIZER BLADE.

SPECIFICATION forming part of Letters Patent No. 484,969, dated October 25, 1892.

Application filed February 16, 1888. Serial No. 264,299. (No model.)

*To all whom it may concern:*

Be it known that I, RICHARD L. LUKENS, a citizen of the United States, residing at Peoria, in the county of Peoria and State of Illinois, have invented certain new and useful Improvements in Harrow and Pulverizer Blades; and I do hereby declare that the following is a full, clear, and exact description of the invention, which will enable others skilled in the art to which it appertains to make and use the same.

This invention relates to blades designed particularly for use on pulverizing-harrows, cultivators, and like implements which serve to cut up and soften the surface of the soil for agricultural purposes.

The object of the present invention is to produce a blade for use on implements above referred to, whereby the soil is cut and moved laterally a short distance by the passage of the tooth therethrough in order that the soil may be pulverized thoroughly by a single operation.

The object of the invention is, furthermore, to produce a blade which by its peculiar shape will be capable of freeing itself from the soil or from sod, weeds, or the like through which it passes.

With these objects in view my invention consists, essentially, in a blade formed substantially as herein described, and shown in the accompanying drawings, in which—

Figure 1 is a side view of the blade. Fig. 2 is a plan view. Fig. 3 is an inverted plan view, and Fig. 4 is a perspective view.

The blade is made up of the main portion A, the flange B, and the tail-piece or extension C, all preferably formed in one piece and of steel or other suitable material. The main portion A is narrow at its front end and increases in depth to the heel D of the blade, and the cutting-edge E, formed on the front of the blade, is curved outward from the front to the rear end, except that part between the extreme front end and the point F, which is straight, in order to insure the proper entrance of the blade into the soil. This portion is also curved slightly outward from bottom to top. The curve of the blade from point F insures the sidewise movement of the soil cut by the front of the blade, and this side displacement insures the perfect disintegration of the soil and reduces it to small particles. The upper edge of the portion A is provided with a flange B, bent at right angles to the said portion, and is provided with holes for the reception of bolts, screws, or the like, whereby the blades are attached to the frame of the implement on which they are used. The tail C is formed integrally with the main blade portion A and is situated about midway of the said portion, leaving a space between its upper edge and the frame to which it is attached. The tail is formed with a spiral twist and is inclined outward from its lower to its upper edge, and it extends inward somewhat abruptly from the point where it joins the main portion A of the blade. By this peculiar form and position of the blade any twigs, grass, sod, or the like cut into by the blades are readily cleared from the blade and prevented from clogging the implement by being carried upward by the tail and allowed to escape between the top of the blade and the frame to which it is attached. The tail also performs the function of a leveler by passing over the surface of the ground after being cut and moved by the main portion of the blade. The flanges and the curves of the blade are so formed that the convex side of the blades are outward, irrespective of the side of the implement to which they are attached.

Having thus described my invention, what I claim as new, and desire to secure by Letters Patent, is—

1. In a pulverizing-blade, the thin blade having a general triangular shape and curved throughout its main portion and coming to a rounded point in front and cut off square at the back portion to the central portion, from which central portion projects the leveling-tail curved backward, substantially as described.

2. A blade for pulverizing-harrows and the like, having the main portion curved outward and widening from the lower portion to the heel and straight at the upper portion, having the tail projecting from the center of the heel, curved backward, substantially as described.

3. A blade for pulverizing, having the main blade portion curved throughout and widening from the point to the heel and having the leveling-tail projection from the central portion of the heel, substantially as described.

4. In a pulverizing-blade, the main portion of the blade, triangular in general form and curved throughout its entire length and having the spiral tail projection from the heel and having a flange at the upper portion of the blade, substantially as described.

In testimony whereof I affix my signature in presence of two witnesses.

RICHARD L. LUKENS.

Witnesses:
DAVID H. MEAD.
A. KEITHLEY.